E. T. WILLIAMS.
GAS TIGHT SHIELD FOR COMPRESSOR SHAFTS.
APPLICATION FILED MAR. 2, 1918.
1,292,197.
Patented Jan. 21, 1919.
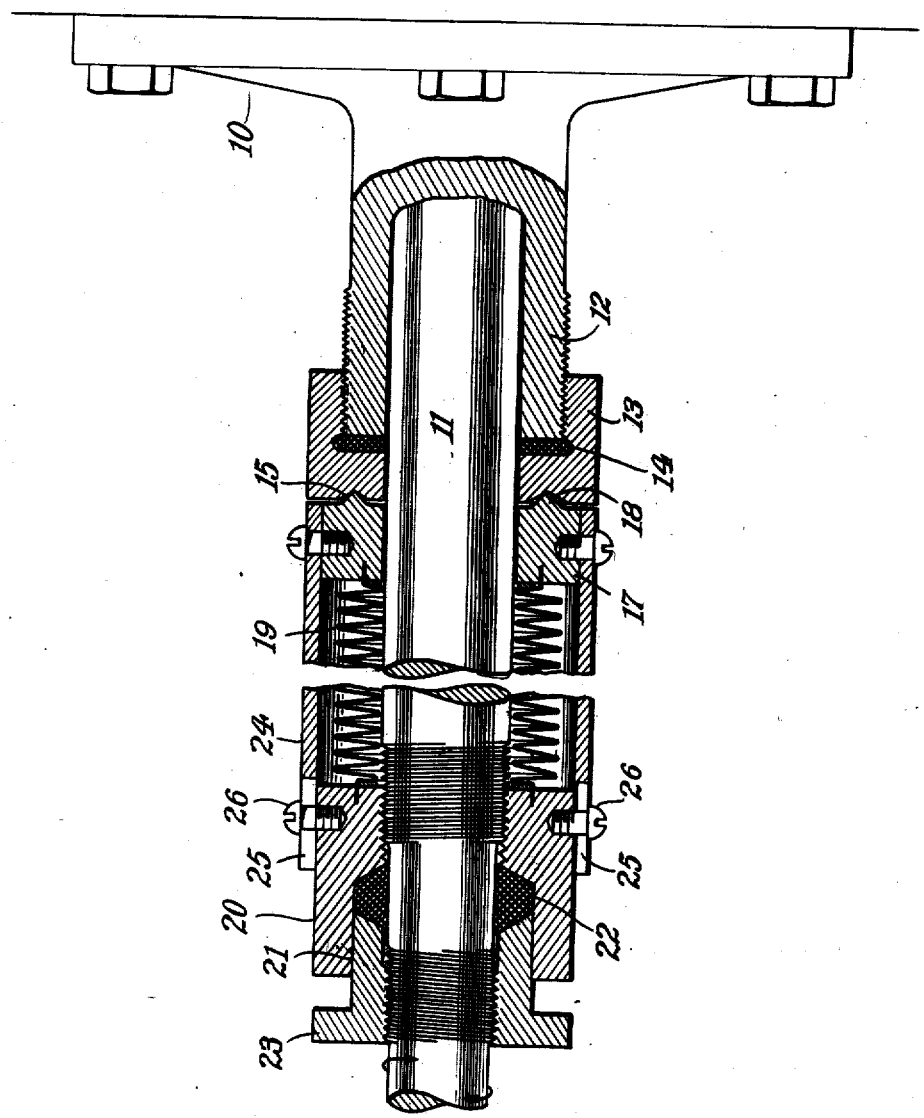
Edward T. Williams,
Inventor
By his Attorneys
Kerr, Page, Cooper & Hayward

UNITED STATES PATENT OFFICE.

EDWARD T. WILLIAMS, OF BROOKLYN, NEW YORK.

GAS-TIGHT SEAL FOR COMPRESSOR-SHAFTS.

1,292,197.  Specification of Letters Patent.  Patented Jan. 21, 1919.

Application filed March 2, 1918. Serial No. 220,054.

*To all whom it may concern:*

Be it known that I, EDWARD T. WILLIAMS, a citizen of the United States, residing at Brooklyn, city of New York, county of Kings, and State of New York, have invented certain new and useful Improvements in Gas-Tight Seals for Compressor-Shafts, of which the following is a full, clear, and exact description.

In machines for handling gases, as for example pumps, compressors, blowers, exhausters, and the like, in which a driving or other rotating shaft extends into the machine, considerable difficulty has been experienced in preventing leakage out of or into the machine along the shaft. In refrigerating apparatus, in which ammonia, ethyl chlorid, or other offensive gas is used, the problem is especially important. It is accordingly the chief object of my present invention to provide an improved seal for the shaft, which will be positively gas-tight under running conditions. A further object is to provide a device of the character indicated, in which the sealing effect will be favored rather than impaired by any wear to which the relatively movable parts are subjected in use. To these and other ends the invention resides in the novel features of construction, arrangements of parts, and combinations of elements, hereinafter described.

Of the various embodiments of which the invention is capable I have selected for illustration and specific description herein the one which at the present time is believed to exhibit the invention in its most convenient and effective form. This embodiment is illustrated in the accompanying drawing, in which the parts are shown in longitudinal section.

Referring to the drawing, 10 designates the casing of a compressor or other machine having a rotary shaft 11 extending into the same from the outside, for example through a neck 12 which may serve as a bearing for the shaft. The neck is threaded to receive a threaded cap 13 encircling the shaft. Between the neck and the cap a gasket or washer 14 may be provided. This gasket may fit the shaft tightly and so may at least diminish leakage along the shaft, but its chief purpose is to prevent leakage past the joint (in the present instance the threaded joint) between the neck 12 and cap 13. In fact, if this latter function is effectively performed, escape of gas past the cap is of no importance. It will be understood that the cap and neck are stationary relatively to each other, except, of course, that the cap may be rotated on the neck for removal or adjustment. In the outer face of the cap is an annular V-shaped groove 15, concentric with the shaft.

Encircling the shaft, next to the cap 13, is a washer 17 having on its inner face a V-shaped rib 18 concentric with the shaft and having its point or apex seated in the apex of the similarly shaped groove 15 in the cap, to produce a gas-tight seal thereat. Fitted gas-tight at one end to the opposite or outer face of the washer is a sealing element 19, also encircling the shaft. This element is preferably a bellows, of thin sheet metal, capable of longitudinal expansion and contraction. At its other end the sealing element or bellows is connected in a gas-tight manner to an adjusting nut 20 threaded (preferably by a right-hand thread) on the shaft 11 so that when the nut is rotated on the shaft the resulting axial movement of the nut will be communicated through the yielding bellows to the washer 17, thereby loosening or tightening the rib 18 in the annular groove 15. In its outer end the nut is provided with a stuffing box 21 containing suitable packing 22 which may be compressed against the shaft, and against the other surfaces with which it is in contact, by the combined gland and locknut 23 threaded (preferably by a left-hand thread) on the shaft 11. Inasmuch as the nut 20 and gland 23 rotate with the shaft when the machine is in operation, no difficulty is encountered in securing a perfectly gas-tight joint at this point, for example by means of the packing 22.

Between the ribbed washer 17 and the adjusting nut 20 is a cage or sleeve 24, preferably secured rigidly to one or the other of said elements, say to the washer or collar 17, and connected to the other, as by means of one or more axial slots 25 and screws 26, in such manner as to permit relative movement of the sleeve and nut axially or longitudinally but compel the two to rotate together. It will therefore be seen that the rotation of the nut 20, which is rotated by the shaft, is communicated to the sealing collar 17 without exerting torsional stress on the sealing bellows 19, which might easily suffer torsional strains and eventually be ruptured, even if made of sheet metal. Moreover, the cage or sleeve 24 effectively protects the more or less delicate bellows against injury by blows or the like.

As will be seen from the above, the gaskets or packings 14 and 22 are compressed between parts which are stationary relatively to each other. The collar 17, however, rotates relatively to the cap or collar 13, but here leakage of gas is effectually prevented by closely fitting rib 18 and groove 15, which are pressed together by the bellows 19, the latter being put under suitable tension by the nut 20. Also, gas leaking into the bellows tends to expand the latter and press the rib still more firmly into the groove, while wear of the rib and groove improves rather than impairs their fit.

The thread on the nut or collar 20 being a right-hand thread, rotation of the shaft in the direction of the arrow tends to move the collar outwardly, because of the slight drag exerted by the friction between the cap 13 and collar or washer 17. On the other hand, the same slight drag is exerted on the gland 23, which has a left-hand thread, so that the gland tends to move inwardly. Consequently if by reason of these influences there should actually be any movement of the nut or the gland, or both, on the shaft, the effect would be to compress instead of release the packing 22, thereby improving rather than impairing the gas-tight seal at such point.

It is to be understood that the invention is not limited to the specific construction herein illustrated and described but can be embodied in other forms without departure from its spirit.

I claim:—

1. In a machine of the kind described, the combination with a stationary part, and a rotary shaft extending through the same, of a collar mounted on the shaft to rotate therewith and having gas-tight connection with the shaft, a collar on the shaft and coöperating with the said stationary part to form a gas-tight seal thereat, a bellows encircling the shaft between the collars and having gas-tight connection with the collars, and axially extending means connecting the collars to cause the second named to rotate with the first.

2. In a machine of the kind described, the combination with a stationary part, and a rotary shaft extending through the same; of a collar on the shaft, rotatable relatively to the said stationary part and coöperating with the latter to form a gas-tight seal; an axially extending bellows surrounding the shaft and at one end having gas-tight connection with the said collar; gas-tight connecting means between the other end of the bellows and the shaft and rotating with the latter; and an element connecting the said means to said collar whereby the latter is caused to rotate with substantially no torsional stress on the bellows.

3. In a machine of the kind described, the combination with a stationary part, and a rotary shaft extending through the same; of a collar axially movable on the shaft, rotatable relatively to the said stationary part and coöperating therewith to form a gas-tight seal; a collar on the shaft, rotatable therewith but axially adjustable thereon and having gas-tight connection with the shaft; an axially resilient bellows encircling the shaft between the collars and having gas-tight connection with the collars; and a sleeve between the collars, connected thereto to rotate the first-named collar from the second and permitting axial movement of at least one of the collars relative to the sleeve.

4. In a machine of the kind described, the combination with a stationary part, and a rotary shaft extending through the same; of a bellows encircling the shaft; means rotatable relatively to the said stationary part to provide a gas-tight connection between said part and one end of the bellows; a collar threaded on the shaft, having gas-tight connection with the other end of the bellows and having a stuffing box; and a gland threaded on the shaft to coöperate with the stuffing box to make a gas-tight seal around the shaft, the threads on the collar and on the gland running in opposite directions, one a left hand and the other a right hand thread, for the purpose set forth.

5. The structure described in claim 4, in combination with a sleeve connecting the collars to cause the two to rotate in unison and permitting one of the collars to be shifted axially relatively to the sleeve.

6. In a shaft-sealing device for the purpose described, in combination, a shaft, a stationary member encircling the shaft, a rotary member encircling the shaft and coöperating hermetically with the stationary member, one of said members being axially movable; a flexible, axially expansible sealing member surrounding the shaft, having one end suitably supported and having its other end hermetically connected with the axially movable member; and means coöperating with the axially movable member to permit axial movement of the same but prevent torsional stresses being exerted on said flexible sealing member by said axially movable member.

7. In a shaft-sealing device for the purpose described, in combination, a shaft; two axially spaced elements encircling the shaft; a flexible, axially expansible sealing member surrounding the shaft between said elements and hermetically connected to both elements; and means coöperating with said elements to prevent relative rotary movement between the two with consequent torsional stresses on the said sealing member but permitting relative axial movement between said elements.

8. In a shaft-sealing device for the purpose described, in combination, a rotary shaft, a stationary element in which the shaft rotates, an element rotating with the shaft and spaced axially from the first element; a sealing device surrounding the shaft between said elements and having a flexible axially expansible portion, said device having rigid hermetic connection with one of said elements and with the other having hermetic connection permitting relative rotary movement; and means coöperating with the sealing device and one of said elements, for opposing relative movement of rotation between said device and the element with which it is rigidly connected but unopposing axial expansion of the said expansible portion of the device, whereby said expansible portion is protected against torsional stresses.

9. In a shaft-sealing device for the purpose described, in combination, a shaft, two axially spaced members encircling the shaft, a flexible, axially expansible sealing device surrounding the shaft between said members and having hermetic connection with both said members; and a sleeve coöperating with both said members to prevent relative rotary movement but permitting relative axial movement between said members, whereby the flexible sealing member is protected against torsional stresses.

10. In a shaft-sealing device for the purpose described, in combination, a shaft, a stationary element in which the shaft rotates, an element threaded on and rotating with the shaft and spaced axially from the first element, and having a stuffing box; a flexible, axially expansible sealing device surrounding the shaft between said elements to provide a hermetic connection between the two; and a gland threaded on the shaft to coöperate with the stuffing box in the second-mentioned element; the threads in the gland and in the second-mentioned element running in opposite directions, one a right hand and the other a left-hand thread, whereby rotation of the shaft tends to draw the said threaded parts together.

In testimony whereof I hereunto affix my signature.

EDWARD T. WILLIAMS.

It is hereby certified that in Letters Patent No. 1,292,197, granted January 21, 1919, upon the application of Edward T. Williams, of Brooklyn, New York, for an improvement in "Gas-Tight Seals for Compressor-Shafts," an error appears requiring correction as follows: In the grant and in the heading of the drawing the title of invention should read *Gas-Tight Seals for Compressor-Shafts* instead of "Gas-Tight Shields for Compressor-Shafts"; and that the said Letters Patent should be read with this correction therein that the same may conform to the record of the case in the Patent Office.

Signed and sealed this 4th day of March, A. D., 1919.

[SEAL.]

R. F. WHITEHEAD,
*Acting Commissioner of Patents.*

Cl. 286—11.